(No Model.)
R. C. COLE.
CULINARY UTENSIL.
No. 561,566. Patented June 9, 1896.
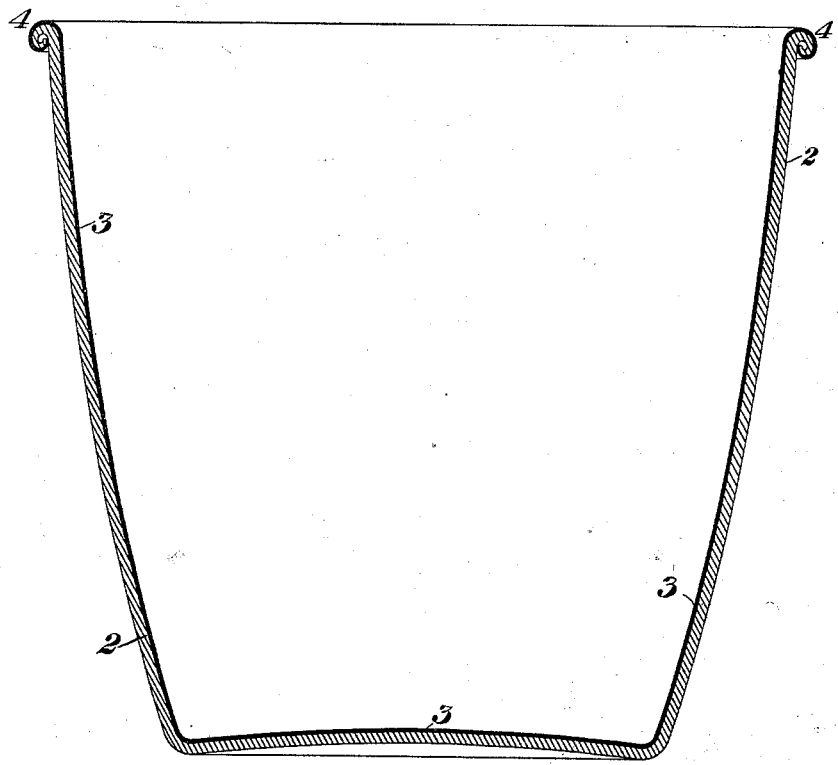
WITNESSES
INVENTOR

UNITED STATES PATENT OFFICE.

ROMAINE C. COLE, OF NEW YORK, N. Y.

CULINARY UTENSIL.

SPECIFICATION forming part of Letters Patent No. 561,566, dated June 9, 1896.

Application filed June 23, 1892. Serial No. 437,704. (No model.)

*To all whom it may concern:*

Be it known that I, ROMAINE C. COLE, of New York, in the county of New York and State of New York, have invented a new and useful Improvement in Culinary Utensils, of which the following is a full, clear, and exact description.

In the accompanying drawing the figure represents a vertical sectional view of my improved culinary vessel.

The object of my invention is to produce a culinary vessel which shall cook more quickly without danger of scorching or burning the food than vessels at present in use, and which shall also have its inner surface composed of a metal which is incorrodible by any of the substances employed in cooking; and it consists in forming the vessel of two layers of metal united in intimate contact, the inner layer being of higher specific heat and higher thermal conductivity than the metal employed for the outer layer of the vessel, and, by being employed in the form of sheet metal instead of mere plating or coating, shall be vastly more durable than any construction of vessel heretofore used for culinary purposes. To the end that the vessels constructed according to my invention may be light, and in view of the fact that aluminium possesses all the desirable qualities above noted and is also light and lower in price than any other suitable metal, I give the preference to aluminium as the lining metal, so that the secondary object of the invention may be said to be the formation of culinary vessels having a lining of aluminium in the form of sheet metal, whereby the vessel is rendered lighter and at the same time more durable than vessels lined with tin or other metals or materials heretofore used for this purpose.

The use in culinary vessels of a vitreous or similar coating, such as is employed in granite and similar ware, is confessedly only adopted as a remedy for the objections which have been found to the use in culinary vessels of tin, copper, iron, and other metals which have been employed for such purposes, the purpose of such vitreous coatings being solely to provide an incorrodible surface to be exposed to the contents of the vessel. The liability of such vitreous coatings to injury by cracking and other well-known causes, and the necessarily heavy character of the articles themselves, render it exceedingly desirable to provide a culinary vessel which shall be wholly of metal, and consequently lighter and less fragile than the vitreous-coated ware, and at the same time shall be capable of quicker heating without danger of burning its contents than either ware with vitreous coating or ordinary metal-coated ware.

Next after its healthfulness the chief desideratum of a culinary vessel is that it shall be capable of cooking quickly and without danger of scorching and spoiling the food. Many articles of food—as cereals, vegetables, fruit, milk, &c.—are exceedingly liable to scorch or burn in cooking, especially if allowed to cook quickly, to avoid which result they are usually cooked in steamers, water-baths, or vessels having double walls with a space between to be filled with water, &c.

I have discovered that in order to enable a vessel to cook quickly, and at the same time to prevent scorching or burning the food, the body-wall of the vessel must be of two or more laminæ or layers in immediate contact, but of exactly opposite physical characteristics as to their specific heat and thermal conductivity. The outer layer, which comes into contact with the source of heat, should be of lower specific heat and lower thermal conductivity than the inner layer for the following reasons, among others: When the outer layer is heated at a given spot, the corresponding and contiguous section of the inner layer requires a longer application of the heat to raise it to the same temperature, and by virtue of its greater thermal conductivity it distributes throughout its mass the heat received from the outer layer. By the time, therefore, that the inner and outer layers have attained about the same temperature at the area exposed to the source of heat the whole of the outer layer has become heated and is giving up its heat to the inner layer at every point. Thus, although the source of heat be at one spot, it cannot become sufficiently concentrated or localized to produce burning of the contents of the vessel, as a portion of the heat is continually being drawn away from the heated area of the outer layer by reason of its lower specific heat and is imparted to the inner layer at all points, so that by reason of the high thermal conductivity of the inner layer the contents of the vessel cannot be scorched or burned until the whole mass of the inner layer is raised to a heat sufficient to scorch, long before which time the cooking will have been completed. If the inner layer were not of higher specific heat than the outer layer the two layers would attain the same temperature almost simultaneously and scorching would quickly ensue.

I have discovered that by means of pressure sheet aluminium and iron or other sheet metal may be united so as to form a strong, light, and durable vessel, and that a lining of aluminium may be formed in vessels of steel, iron, copper, and other metals, either by first drawing or partially drawing the vessel and then placing a thin sheet of aluminium or a blank of sheet aluminium within the drawn vessel or partially-drawn blank and subjecting the two metals when in contact with each other to a further drawing operation, by which they are joined to and caused to conform one with the other, or in some cases by drawing the two sheets together at a single operation.

I will now describe my invention, so that others skilled in the art may manufacture the same.

In the drawing, figure 2 represents the body of the culinary utensil of drawn sheet metal, having a lining 3, drawn from a sheet of aluminium. The metal body of the vessel, as well as the aluminium lining, are curled together at their upper edge, forming the bead 4, which serves to prevent a separation of the lining from the vessel.

Inasmuch as aluminium is softer and more ductile than iron, steel, or other metal of lower specific heat and lower thermal conductivity which could be used for the outer layer of the vessel, there is, unless a due proportion of thickness in the two layers is preserved, a difficulty in drawing the two sheets at once without tearing or drawing out of shape the aluminium lining. For this reason I prefer in most cases to first draw the outer layer 2 of the vessel from sheet metal by means of suitable dies in the usual manner. By means of similar dies I draw a blank from a thin sheet of aluminium and place this blank within the vessel 2 and then subject the two materials thus placed in contact with each other to a further drawing operation, which causes the layers 2 and 3 to conform in shape with each other, and causes a mechanical union between the two metals.

To prevent separation of the two layers from each other, the edges may be curved or turned, so as to form the bead 4. (Shown in the drawing.) Instead of forming the blank from sheet aluminium, I may insert the aluminium sheet in the partly-drawn iron or other shell and draw the metals together in the die or press. When, however, the steel sheet is soft or annealed and not too thick sheets are employed, the two sheets can readily be drawn together. In the case of a metal as hard as silver, which also has a high thermal conductivity, the two sheets can be drawn together without trouble; but as aluminium, although not the only metal embraced in my invention, is the only one sufficiently cheap at the present time to enable it to be employed for culinary vessels in competition with tin and other ware, I prefer to use it and have described the method employed in forming vessels with aluminium lining, it being understood that it is merely the best and not the only metal applicable to the construction of culinary vessels embodying the essence of my invention and that the same method of manufacture may be employed in forming vessels with a lining of other incorrodible metals of high specific heat and high thermal conductivity.

The advantages of vessels composed of an inner layer of incorrodible metal which has high specific heat and high thermal conductivity are quicker cooking without burning their contents and the impossibility of impregnating the food with deleterious salts or compounds, greater durability, and their retaining their heat longer, to realize which advantages it is important that the outer layer should be of metal having lower specific heat and lower thermal conductivity than the inner layer or lining, whence arises the choice of iron or steel for the outer layer.

An additional advantage arising from the use of aluminium and steel as the metals of the vessel is that iron and aluminium are very close together in the electrochemical scale, so the possibility of any electrochemical action between the layers of the vessel is practically prevented.

Although I have invented a method by means of which an aluminium lining may be formed in culinary vessels and by means of which I am enabled to produce a new article of manufacture which is readily distinguishable from all other similar articles, I do not herein desire to claim the same, as it forms the subject of Letters Patent No. 513,762, granted to me January 30, 1894.

I claim—

1. As a new article of manufacture, a culinary vessel formed of two layers of metal, secured together without any vacant space between, the outer layer being a metal of low specific heat and low thermal conductivity, as iron or steel, and the inner layer an incorrodible metal of high thermal conductivity and high specific heat, as aluminium, substantially as described.

2. As a new article of manufacture, a culinary vessel formed of two layers of metal, the outer layer being a metal of low thermal conductivity and low specific heat, as iron or steel, and the inner layer an incorrodible metal of higher thermal conductivity and higher specific heat, as aluminium, the two metals being united in intimate contact by pressure, substantially as described.

3. A culinary vessel composed of two layers of metal of opposite specific heat and opposite thermal conductivity but closely related electrochemically, as iron and aluminium, the inner layer being of aluminium and the outer of iron, the layers being united in intimate contact by pressure, substantially as described.

4. A culinary vessel composed of an outer layer of iron and an inner layer of aluminium, the two layers being united in intimate contact by pressure as and for the purposes hereinbefore set forth.

In testimony whereof I have hereunto set my hand this 9th day of June, A. D. 1892.

ROMAINE C. COLE.

Witnesses:
J. I. A. PORTER,
J. M. MONTFORT.